Patented June 25, 1940

2,205,635

UNITED STATES PATENT OFFICE 2,205,635

METHOD OF CHANGING THE CHARACTER OF SOLUTIONS BY BASE EXCHANGE

Pieter Smit, Amsterdam, Netherlands, assignor to N. V. Octrooien - Maatschappij "Activit," Amsterdam, Netherlands No Drawing. Application January 10, 1935, Serial No. 1,266. In the Netherlands January 19, 1934

13 Claims. (Cl. 210—24)

My invention relates to the removal and/or exchange of cations from electrolytes, in which they are dissolved, and quite particularly to a method of water purification which enables the character of natural water to be changed according to requirements.

The invention is particularly concerned with the use of certain active substances the preparation of which is described in a copending application, Ser. No. 1,265, filed of even date herewith and which are therefore not claimed in the present application.

Hitherto substances such as salts dissolved in liquids, for instance in nautral water, but also coloring matter, odors, etc., have been removed from the liquid by treating the liquid with activated carbon or other active, chemically inert substances, which have also been used as adsorbents for gases and vapours.

Active carbon has been prepared either by the carbonization of carbonaceous materials and activation in contact with suitable gases or vapours, or by impregnating a carbonized substance with chemicals for activation. Carbon has been activated with water vapour, carbon dioxide, chlorine, air, oxygen and other gases or vapours, or it has been impregnated for instance with calcium hydroxide, caustic soda, sulphuric acid, zinc chloride and the like. The active substances thus prepared were intended to be chemically inert and to this end carbonization of the organic matter was effected at high temperatures.

I have now found that it is possible to produce humic zeolites which, being of an acid character, are also chemically active and display a great adsorptive and base exchanging and fixing capacity which render them admirably suited for the removal and/or exchange of dissolved or suspended cations including hydrogen ions, from liquids and quite especially water.

These humic zeolites have a character similar to the bodies known as humus, humic acid, etc., which are mostly of unknown constitution, and are characterized by being partly or entirely oxidized by dilute nitric acid and soluble in caustic soda solution.

As described in my acknowledged copending application aforesaid, these humic substances are obtained by reacting carbonaceous materials capable of being carbonized by dehydration, that is by chemical reaction with strongly dehydrating chemicals and more particularly pit-coal (anthracite), but also starch, sawdust, flour and similar materials, with an excess of strongly dehydrating chemicals such as strong mineral acids (sulphuric, hydrochloric and phosphoric acids) zinc chloride, calcium chloride, etc. Strong sulphuric acid reagents, such as the concentrated acid, fuming sulphuric acid and sulfuric acid anhydride, including gaseous $SO_3$, are particularly suitable for use in my process. The reaction may be termed a carbonization by dehydration. Care should be taken to keep the temperature in the mass under treatment below 300° C. and in some cases as near 60° C. as possible.

The following are examples of procedure which may be employed in making the active substances of my invention:

*Example 1.*—Anthracite is subjected during several hours to the action of pyrosulphuric acid. The mass under reaction is cooled as described above to keep the temperature within the mass below 250 to 300° C. and as near to 60° C. as possible. The dark colored product resulting in this treatment resembles the product of the rotting of leaves.

*Example 2.*—Granulated pit-coal is subjected during several hours to the action of gaseous sulphuric acid anhydride ($SO_3$), the mass being cooled to keep the temperature within the mass between 250 and 60° C. and as near as possible to the lower limit. When the reaction has come to an end, the dark-colored mass is placed in water and washed.

*Example 3.*—One part (by weight) starch flour is mixed with 5 to 6 parts fuming sulfuric acid and the mixture is brought to a temperature of about 200° C. by suitably choosing the quantity of acid added at a time and allowing it to act sufficiently long on the carbonaceous substance. It is possible in this manner to dispense with any application of external heat.

*Example 4.*—One part by weight very finely ground wood meal is mixed with five parts of a saturated aqueous solution of zinc chloride $ZnCl_2$. The mixture is heated to about 200° C. The product resulting in the reaction is washed first with hydrochloric acid and thereafter with water and may be granulated by passing it through a sieve.

The ion-exchanging humic zeolite products thus obtained possess a far greater activity than activated carbon, as evidenced by a much greater cation-exchanging capacity (zeolitic power), and are therefore admirably adapted for changing the character of natural water to suit different purposes, for instance softening the water and binding alkaline substances dissolved therein, being enabled to act in this manner owing to their acid character.

It is thus possible, with the aid of such active humus-like acid products, to remove the ions of the alkali metals and ammonia and thus to neutralize the water. It is equally possible to remove, with their aid, the ions of calcium and magnesium or the oxides of iron and aluminium and thus to eliminate the hardness of the water leaving it acid. The metal ions in the water are thus replaced by hydrogen ions. If water of permanent hardness (resulting from the presence of calcium and magnesium salts of strong acids) is passed in contact with a humus-like substance of the kind above described, which has been neutralized with an alkali carbonate, the calcium and magnesium ions will be exchanged for alkali ions and the permanent hardness of the water will thus be eliminated also.

I thus obtain the advantage of being able to obtain neutral and soft water by treating it either with the acid or the neutralized humus-like product containing exchangeable hydrogen or metal ions, in contradistinction to the action of zeolites which render the water alkaline. Now, if I pass a solution of sodium chloride in contact with my humus-like substance, after this latter has been exhausted, that is charged or saturated with calcium and magnesium ions, the reverse takes place, these latter ions being exchanged for sodium ions, whereupon the active substance is once more ready to remove the permanent hardness of water.

When a dilute acid is passed in contact with my active humus-like substance saturated with calcium and magnesium ions, these ions will be exchanged for hydrogen ions and the humus-like substance will be regenerated in the sense of being made once more capable of softening water. This ion-binding or exchanging capacity of my active humus-like substances is such that these substances are able to exchange the metal ions of any salts dissolved in the water or other solvent for the hydrogen ion, whereby an acid is formed.

The active principle of the acid humus-like substances proper can be isolated by extraction with alkali and neutralization. If salts are added to the solution thus obtained, there results a mass which possesses only little activity. If inert and insoluble substances such as for instance carbon, pipe-clay, fuller's earth, calcium phosphates or the like are added to the alkaline solution, which may or may not be neutralized, the active substance will be precipitated on the particles of carbon, pipe-clay or the like and owing to the larger surface over which it is then distributed, its activity may be greatly enhanced.

Various changes may be made in the details disclosed in the foregoing specification without departing from the invention or sacrificing the advantages thereof.

I claim:

1. In the treatment of electrolytes containing saline cations, the process which comprises exchanging said cations by passing such an electrolyte in contact with a bed of humic zeolite produced by treatment of carbonaceous materials at temperatures not substantially exceeding 300° C. with more than an equal weight of a strongly dehydrating reagent reacting upon said carbonaceous material to form acidic humic compounds.

2. In the treatment of electrolytes containing saline cations, the process which comprises exchanging said cations by passing such an electrolyte in contact with a carbonaceous zeolite having a high ion exchange capacity produced by chemical reaction of carbonaceous materials with more than an equal weight of a strongly dehydrating chemical at temperatures ranging from about 60° to 300° C.

3. In the softening of water containing hardness-producing salines by ion-exchange methods, the process which comprises exchanging the cations of said salines by passing said water in contact with a carbonaceous zeolite produced by reacting a solid carbonaceous material, capable of being carbonized by chemical reaction with strongly dehydrating chemicals, with more than an equal weight of a strong sulfuric acid reagent at low temperatures to form acidic humic substances.

4. In the softening of water containing hardness-producing salines by ion-exchange methods, the process which comprises exchanging the cations of said salines by passing said water in contact with a carbonaceous zeolite produced by reacting a solid carbonaceous material with a strongly dehydrating chemical at temperatures ranging from about 60° to 300° C. and in sufficient excess to form humic compounds.

5. In the softening of water containing hardness-producing salines by ion-exchange methods, the process which comprises exchanging the cations of said salines by passing said water in contact with a carbonaceous zeolite produced by reacting a carbonaceous material with more than an equal weight of a strongly dehydrating chemical at low temperatures to produce a high capacity for ion exchange, followed by contacting said reacted material with an aqueous solution of an alkali metal salt.

6. In the softening of water containing hardness-producing salines by ion-exchange methods, the cyclic process which comprises exchanging the cations of said salines by passing said water in contact with a carbonaceous zeolite produced by reacting a carbonaceous material, capable of being carbonized by dehydration, with a strongly dehydrating chemical at low temperatures and in sufficient excess to form a substantial proportion of humic compounds in said material; regenerating said zeolite, when exhausted, by contacting the same with an aqueous solution of an alkali metal salt and again passing water to be softened in contact with the regenerated zeolite.

7. In the treatment of electrolytes containing saline cations, the cyclic process which comprises exchanging said cations by passing such an electrolyte in contact with a carbonaceous zeolite produced by reacting a carbonaceous material with a strongly dehydrating chemical at low temperatures and in quantity to form substantial amounts of humic substances in said material: regenerating said zeolite when exhausted by contacting the same with an aqueous solution of an acid, and again passing further quantities of said electrolyte in contact with the regenerated zeolite.

8. In the softening of water containing hardness-producing salines by ion-exchange methods, the process which comprises reacting a carbonaceous material, capable of being carbonized by dehydration to produce a granular product, with more than an equal weight of a concentrated sulfuric acid reagent to produce a high capacity for ion-exchange, treating the resulting acid carbonaceous zeolite with a solution of an alkali metal salt to charge the same with alkali metal cations, then passing water to be softened in contact with the resulting charged zeolite, thereby softening said water by ion exchange.

9. In the treatment of water containing saline cations, the process which comprises exchanging said cations by passing such water in contact with a bed of granular carbonaceous zeolite, produced by reacting a carbonaceous material with more than an equal weight of a strongly dehydrating chemical at low temperatures until the resulting reaction product has a high capacity for ion exchange and is at least partly soluble in caustic soda solution and at least partly oxidizable by dilute nitric acid.

10. In the treatment of water containing saline cations, the process which comprises exchanging said cations by passing such water in contact with a bed of granular carbonaceous zeolite, produced by reacting a carbonaceous material with more than an equal weight of a strong sulfuric acid reagent at low temperatures until the resulting reaction product has a high capacity for ion exchange and is at least partly soluble in caustic soda solution and at least partly oxidizable by dilute nitric acid.

11. The process of claim 9 wherein the carbonaceous material is flour.

12. In the purification of water, the cyclic process of removing dissolved saline matter which comprises contacting the water with a a solid, insoluble, chemically active zeolite formed by treating a solid carbonaceous material with more than an equal weight of a concentrated sulfuric acid reagent to produce a high capacity for ion exchange, regenerating said insoluble material by treating it with dilute acid, and repeating the treatment of water with regenerated material.

13. In the treatment of electrolytes containing saline cations, the cyclical process which comprises exchanging said cations by bringing the electrolyte into contact with a carbonaceous zeolite produced by reacting a carbonizable organic material with a strongly dehydrating chemical at low temperatures and in sufficient quantity to form substantial amounts of humic substances in said material, regenerating said zeolite when exhausted by contacting the same with an aqueous solution of an alkali metal salt and again bringing further quantities of said electrolyte into contact with the regenerated zeolite.

PIETER SMIT.

CERTIFICATE OF CORRECTION.

Patent No. 2,205,635. June 25, 1940.

PIETER SMIT.

It is hereby certified that error appears in the printed specification of the above numbered patent requiring correction as follows: Page 1, first column, line 14, for "nautral" read --natural--; page 2, first column, line 6, for the word "oxides" read --ions--; and that the said Letters Patent should be read with this correction therein that the same may conform to the record of the case in the Patent Office.

Signed and sealed this 24th day of September, A. D. 1940.

Henry Van Arsdale,
Acting Commissioner of Patents.

(Seal)